US012592975B1

(12) United States Patent　　　　　(10) Patent No.:　US 12,592,975 B1

Moore　　　　　　　　　　　　　　　(45) Date of Patent:　Mar. 31, 2026

(54) ALIGNMENT OF CLERICAL AND CONFIGURATION SECURITY POLICY USING ARTIFICIAL INTELLIGENCE (AI)

(71) Applicant: ForeScout Technologies, Inc., San Jose, CA (US)

(72) Inventor: Andrew Moore, Tampa, FL (US)

(73) Assignee: ForeScout Technologies, Inc., San Jose, CA (US)

( * ) Notice: Subject to any disclaimer, the term of this patent is extended or adjusted under 35 U.S.C. 154(b) by 0 days.

(21) Appl. No.: 18/973,564

(22) Filed: Dec. 9, 2024

(51) Int. Cl.
　　*H04L 12/24*　　　(2006.01)
　　*H04L 9/40*　　　(2022.01)
　　*H04L 29/06*　　　(2006.01)

(52) U.S. Cl.
　　CPC ................................. H04L 63/20 (2013.01)

(58) Field of Classification Search
　　CPC ...................................................... H04L 63/20
　　See application file for complete search history.

(56) References Cited

U.S. PATENT DOCUMENTS

| | | | |
|---|---|---|---|
| 2008/0235023 A1* | 9/2008 | Kennewick | ......... G10L 15/1822 704/E15.04 |
| 2014/0075519 A1* | 3/2014 | Porras | ................... H04L 63/107 726/4 |
| 2014/0379738 A1* | 12/2014 | Wang | ...................... G06F 16/24 707/756 |
| 2019/0132214 A1* | 5/2019 | Porras | ................... H04L 41/147 |
| 2022/0131904 A1* | 4/2022 | Wright | ................. H04L 63/102 |

* cited by examiner

*Primary Examiner* — Noura Zoubair

(74) *Attorney, Agent, or Firm* — Womble Bond Dickinson (US) LLP

(57)　　　　　　ABSTRACT

Systems and methods for comparing and aligning clerical and configurational security policies are described. Methods include retrieving a clerical-based security policy and a configuration-based security policy associated with a network, generating a comparison prompt to a generative artificial intelligence (AI) model comprising a request to compare the clerical-based security policy and the configuration-based security policy, providing the comparison prompt to the generative AI model; and receiving a response from the generative AI model comprising indications of discrepancies between the clerical-based security policy and the configuration-based security policy.

15 Claims, 9 Drawing Sheets

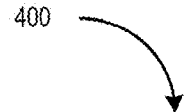

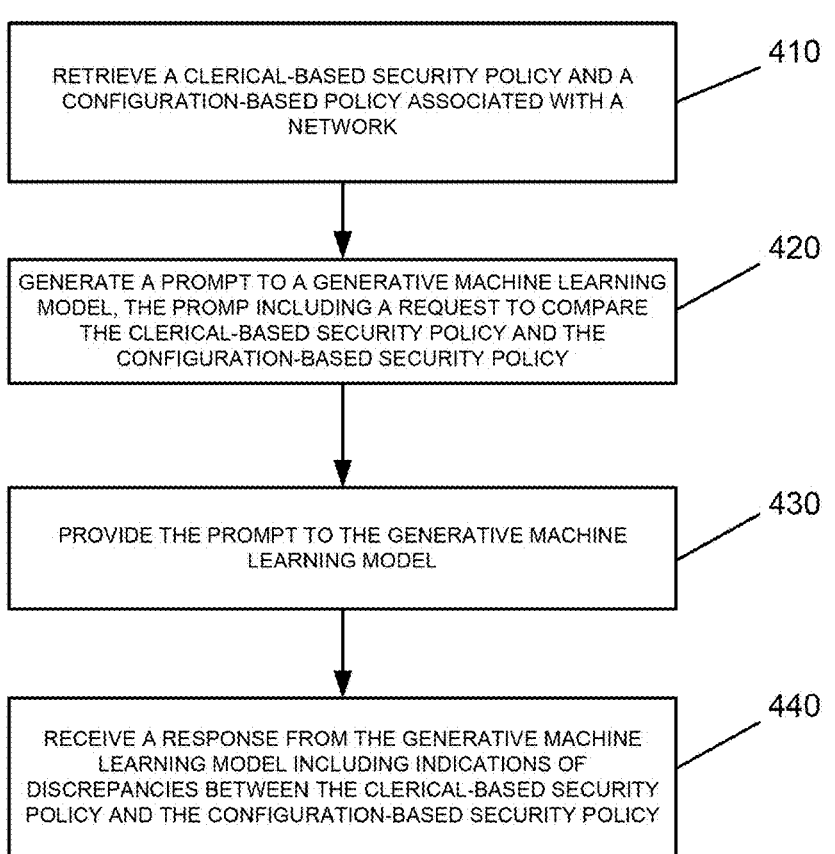

400

RETRIEVE A CLERICAL-BASED SECURITY POLICY AND A CONFIGURATION-BASED POLICY ASSOCIATED WITH A NETWORK — 410

GENERATE A PROMPT TO A GENERATIVE MACHINE LEARNING MODEL, THE PROMP INCLUDING A REQUEST TO COMPARE THE CLERICAL-BASED SECURITY POLICY AND THE CONFIGURATION-BASED SECURITY POLICY — 420

PROVIDE THE PROMPT TO THE GENERATIVE MACHINE LEARNING MODEL — 430

RECEIVE A RESPONSE FROM THE GENERATIVE MACHINE LEARNING MODEL INCLUDING INDICATIONS OF DISCREPANCIES BETWEEN THE CLERICAL-BASED SECURITY POLICY AND THE CONFIGURATION-BASED SECURITY POLICY — 440

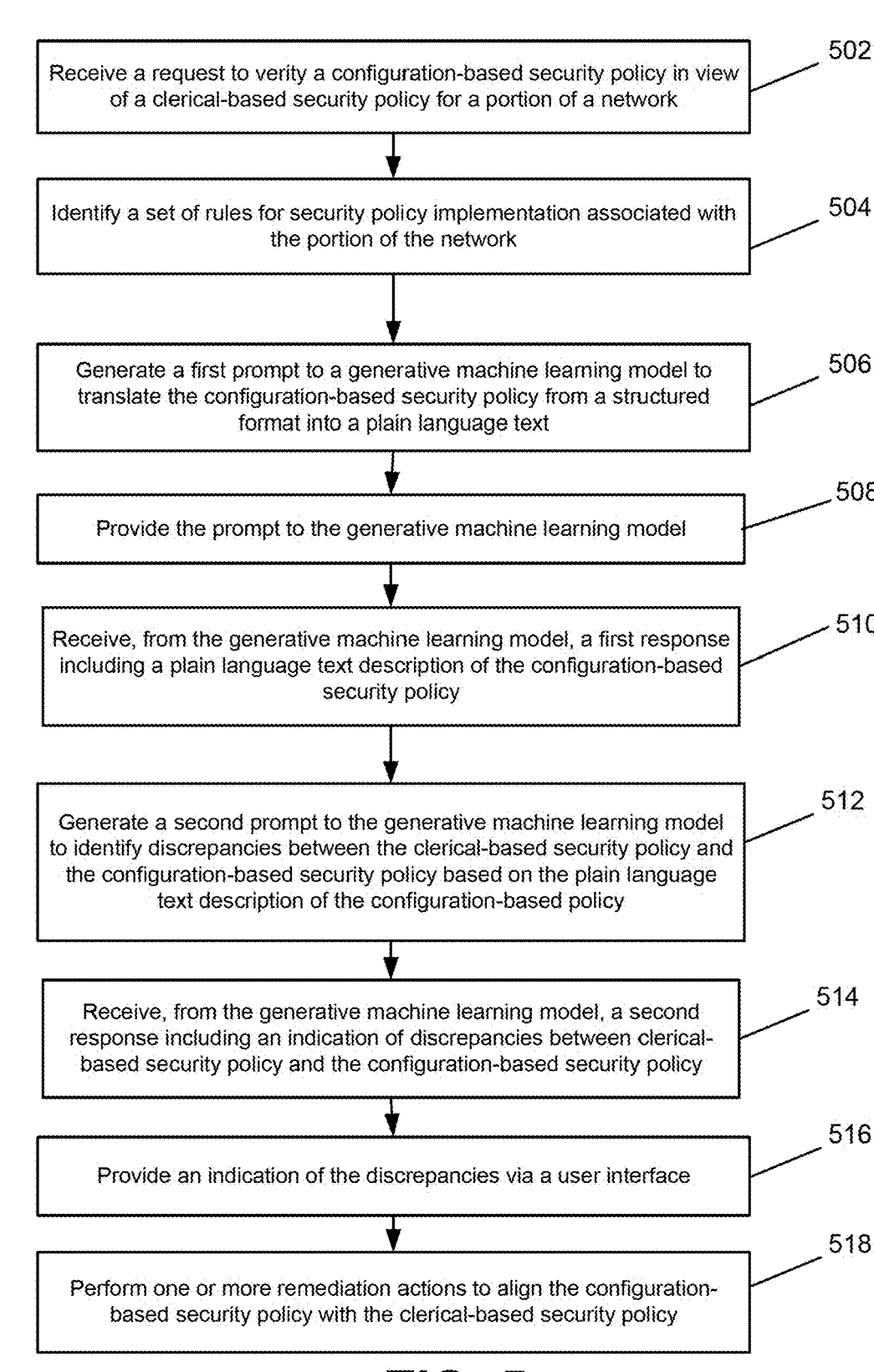

502 — Receive a request to verify a configuration-based security policy in view of a clerical-based security policy for a portion of a network 504 — Identify a set of rules for security policy implementation associated with the portion of the network 506 — Generate a first prompt to a generative machine learning model to translate the configuration-based security policy from a structured format into a plain language text 508 — Provide the prompt to the generative machine learning model 510 — Receive, from the generative machine learning model, a first response including a plain language text description of the configuration-based security policy 512 — Generate a second prompt to the generative machine learning model to identify discrepancies between the clerical-based security policy and the configuration-based security policy based on the plain language text description of the configuration-based policy 514 — Receive, from the generative machine learning model, a second response including an indication of discrepancies between clerical-based security policy and the configuration-based security policy 516 — Provide an indication of the discrepancies via a user interface 518 — Perform one or more remediation actions to align the configuration-based security policy with the clerical-based security policy

*FIG. 5*

ALIGNMENT OF CLERICAL AND CONFIGURATION SECURITY POLICY USING ARTIFICIAL INTELLIGENCE (AI)

TECHNICAL FIELD

Aspects and implementations of the present disclosure relate to network security policy management and more specifically, to comparing and contrasting clerical and configuration security policy using artificial intelligence (AI).

BACKGROUND

As technology advances, the number and variety of devices or entities that are connected to communications networks are rapidly increasing. Each device or entity may have its own respective vulnerabilities which may leave the network open to compromise or other risks. Preventing the spreading of an infection of a device or entity, or an attack through a network can be important for securing a communication network. Accordingly, aligning clerical, human based network security policies, and configurational network security policies may reduce vulnerabilities of a network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 4 depicts a flow diagram of an example method of comparing clerical and configuration based security policies, according to some embodiments of the present disclosure.

FIG. 5 depicts a flow diagram of an example method of comparing and aligning clerical and configuration based security policies, according to some embodiments of the present disclosure.

DETAILED DESCRIPTION

Figure 1:
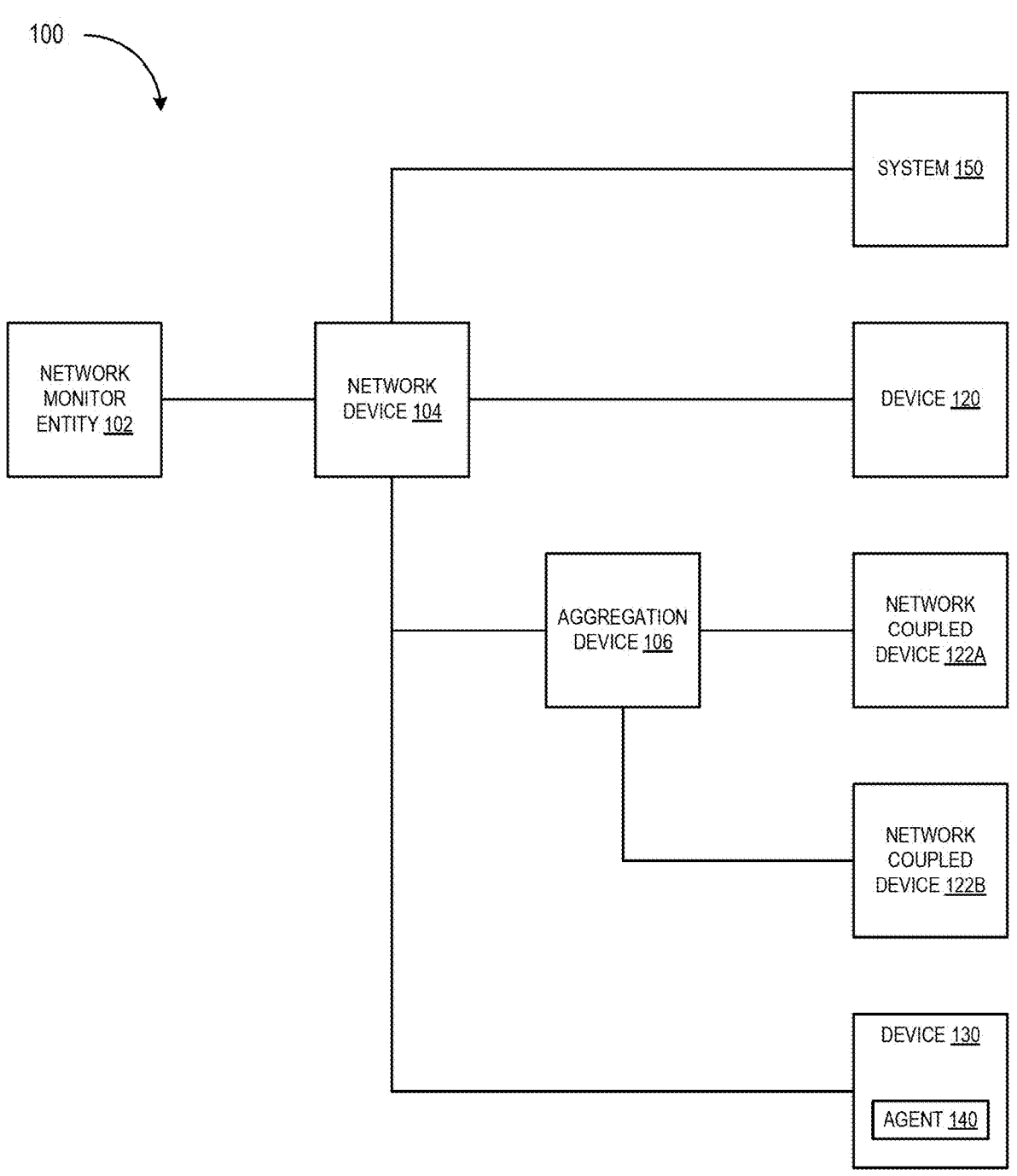
FIG. 1 depicts an illustrative communication network in accordance with one implementation of the present disclosure.

Aspects and implementations of the present disclosure are directed to comparing and aligning clerical and configuration based security policies using a generative artificial intelligence (AI) model. The systems and methods disclosed can be employed with respect to network security, among other fields. More particularly, it can be appreciated that devices or entities with vulnerabilities are a significant and growing problem. At the same time, the proliferation of network-connected devices (e.g., internet of things (IoT) devices such as televisions, security cameras (IP cameras), wearable devices, medical devices, etc.) can make it difficult to effectively ensure that network security is maintained.

In the context of organizational security, there is often a gap between theoretical design of written clerical-based security policy and the actual implementation of intended security policies in network and device configurations (e.g., configuration-based security policy). In conventional systems, these discrepancies may lead to unintended and unexpected vulnerabilities and inefficiencies in the security infrastructure and its enforcement by various teams of an organization.

Embodiments of the present disclosure provide for an artificial intelligence (AI) based process for comparing and contrasting the documentation of clerical-based policies providing for intended security policy application and enforcement with the actual configuration-based policies that are applied within a network to enforce those written policies.

In particular, in response to a request to analyze and align policies (e.g., clerical and configurational policies) of a security module of a network security system, processing logic may extract or otherwise retrieve a configuration-based policies from a network security administration system in a structured data format, such as XML, JSON, or the like. The processing logic may generate a prompt to a generative AI model requesting the model to interpret the configuration-based policy and provide a plain text description of the operation of the configuration-based policy. In some embodiments, this initial prompt may include various context associated with the security module of the network security system, such as the available properties of the module and limitations or restrictions of the available properties, as well as any other sets of rules associated with the module. Thus, the provided context may operate as a dictionary for the AI model to interpret the operation of the configuration-based policy into plain language. The processing logic may then receive a response from the AI model including a plain-text description of the configuration-based policy.

Upon receiving the plain-text description of the configuration-based policy, the processing logic may further generate a comparison prompt including a request to the AI model to compare, contrast, or otherwise identify discrepancies between the configuration-based policy and the clerical-based policy. The prompt may include the plain text description of the configuration-based policy and the clerical-based policy and the request to identify the differences between the two policies. The processing logic may receive a response from the AI model including an identification of the differences. In some embodiments, the identification of the differences may include a description of the properties of the configuration-based policy that differ or cause the differences between the two policies, an identification of aspects of the clerical-based policy that are not being properly implemented by the configuration-based policy, and any other identifying information to assist with remediation of the discrepancies. Thus, embodiments enable organizations to not only design effective written security policies but also to ensure their proper execution, thereby enhancing the security posture of the organization and mitigating risks more efficiently with proper documentation that matches the implemented configuration.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Network segmentation can be used to enforce security policies on a network, for instance in large and medium organizations, by restricting portions or areas of a network which an entity can access or communicate with. Segmentation or "zoning" can provide effective controls to limit movement across the network (e.g., by a hacker or malicious software). Enforcement points including firewalls, routers, switches, cloud infrastructure, other network devices/entities, etc., may be used to enforce segmentation on a network (and different address subnets may be used for each segment). Enforcement points may enforce segmentation by filtering or dropping packets according to the network segmentation policies/rules. The viability of a network segmentation project depends on the quality of visibility the organization has into its entities and the amount of work or labor involved in configuring network entities. Accordingly, the generation and use of a taxonomy framework may assist proper application of segmentation policies and rules based on entity or device classifications (e.g., role or function).

Although some embodiments are described herein with reference to network devices, embodiments also apply to any entity communicatively coupled to the network. An entity or entities, as discussed herein, include devices (e.g., computer systems, for instance laptops, desktops, servers, mobile devices, IoT devices, OT devices, etc.), endpoints, virtual machines, services, serverless services (e.g., cloud-based services), containers (e.g., user-space instances that work with an operating system featuring a kernel that allows the existence of multiple isolated user-space instances), cloud-based storage, accounts, and users. Depending on the entity, an entity may have an IP address (e.g., a device) or may be without an IP address (e.g., a serverless service).

The enforcement points may be one or more network entities (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the entity and one or more other entities communicatively coupled to a network. Access rules may control whether an entity can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any entity that is capable of filtering, controlling, restricting, or the like communication or access on a network.

FIG. 1 depicts an illustrative communication network 100, in accordance with one implementation of the present disclosure. The communication network 100 includes a network monitor entity 102, a network device 104, an aggregation device 106, a system 150, devices 120 and 130, and network coupled devices 122A-B. The devices 120 and 130 and network coupled devices 122A-B may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices/entities of communication network 100 may communicate in a variety of ways including wired and wireless connections and may use one or more of a variety of protocols.

Network device 104 may be one or more network entities configured to facilitate communication among aggregation device 106, system 150, network monitor entity 102, devices 120 and 130, and network coupled devices 122A-B. Network device 104 may be one or more network switches, access points, routers, firewalls, hubs, etc.

Network monitor entity 102 may be operable for a variety of tasks such entity classification and taxonomy framework management via an AI classification model using a defined taxonomy framework, as described herein. Network monitor entity 102 may be a computing system, network device (e.g., router, firewall, an access point), network access control (NAC) device, intrusion prevention system (IPS), intrusion detection system (IDS), deception device, cloud-based device, virtual machine based system, etc. Network monitor entity 102 may be communicatively coupled to the network device 104 in such a way as to receive network traffic flowing through the network device 104 (e.g., port mirroring, sniffing, acting as a proxy, passive monitoring, a SPAN (Switched Port Analyzer) port, etc.). In some embodiments, network monitor entity 102 may include one or more of the aforementioned devices. In various embodiments, network monitor entity 102 may further support high availability and disaster recovery (e.g., via one or more redundant devices).

In some embodiments, network monitor entity 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor entity 102 may be based on a combination of one or more pieces of information including traffic analysis, information from external or remote systems (e.g., system 150), communication (e.g., querying) with an aggregation device (e.g., aggregation device 106), and querying the device itself (e.g., via an API, CLI, web interface, SNMP, etc.), which are described further herein. Network monitor entity 102 may be operable to use one or more APIs to communicate with aggregation device 106, device 120, device 130, or system 150. Network monitor entity 102 may monitor for or scan for entities that are communicatively coupled to a network via a NAT device (e.g., firewall, router, etc.) dynamically, periodically, or a combination thereof.

Information from one or more external or $3^{rd}$ party systems (e.g., system 150) may further be used for determining one or more tags or characteristics for an entity. For example, a vulnerability assessment (VA) system may be queried to verify or check if an entity is in compliance and provide that information to network monitor entity 102. External or $3^{rd}$ party systems may also be used to perform a scan or a check on an entity to determine a software version.

Device 130 can include agent 140. The agent 140 may be a hardware component, software component, or some combination thereof configured to gather information associated with device 130 and send that information to network monitor entity 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor entity 102 (e.g., a network monitor device) may utilize agent information from the agent 140. While network monitor entity 102 may be able to receive information from agent 140, installation or execution of agent 140 on many entities may not be possible, e.g., IT or smart devices.

System 150 may be one or more external, remote, or third party systems (e.g., separate) from network monitor entity 102 and may have information about devices 120 and 130 and network coupled devices 122A-B. System 150 may include a vulnerability assessment (VA) system, a threat detection (TD) system, endpoint management system, a mobile device management (MDM) system, a firewall (FW) system, a switch system, an access point system, etc. Network monitor entity 102 may be configured to communicate with system 150 to obtain information about devices 120 and 130 and network coupled devices 122A-B on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor entity 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to an entity being monitored by network monitor entity 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor entity 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network entities (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor entity 102 which may be used to monitor entities and control network access of one or more entities. The switch or AP system may have one or more interfaces for communicating with IoT or smart devices or other entities (e.g., ZigBee™, Bluetooth™, etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122A-B and provide network access to network coupled devices 122A-B. Aggregation device 106 may further be configured to provide information (e.g., operating system, device software information, device software versions, device names, application present, running, or both, vulnerabilities, patch level, etc.) to network monitor entity 102 about the network coupled devices 122A-B. Aggregation device 106 may be a wireless access point that is configured to communicate with a wide variety of entities through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122A-B via a wireless connection. Aggregation device 106 may be configured to communicate with network coupled devices 122A-B using a standard protocol with proprietary extensions or modifications.

Aggregation device 106 may further provide log information of activity and attributes of network coupled devices 122A-B to network monitor entity 102. It is appreciated that log information may be particularly reliable for stable network environments (e.g., where the types of entities on the network do not change often). The log information may include information of updates of software of network coupled devices 122A-B.

Figure 2:
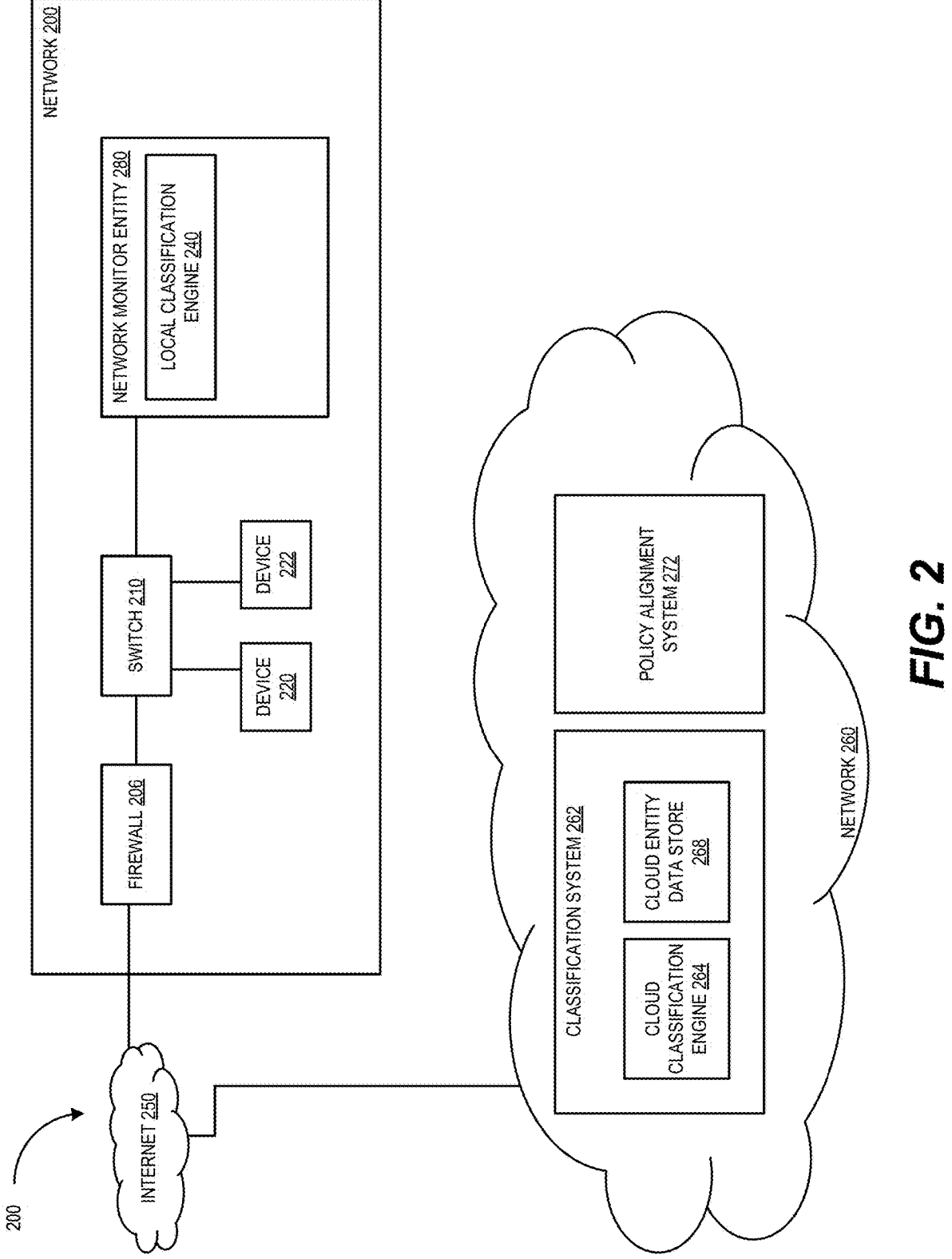
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewall 206 and switch 210) and a network monitor entity 280 (e.g., network monitor entity 102) which can perform network monitoring and entity classification for application of security policies, as described herein, associated with the various entities communicatively coupled in example network 200.

FIG. 2 further shows example devices 220-222 (e.g., devices 106, 122A-B, 120, and 130, other physical or virtual devices, other entities, etc.) and it is appreciated that more or fewer network entities or other entities may be used in place of the devices of FIG. 2. Example devices 220-222 may be any of a variety of devices or entities (e.g., smart devices, multimedia devices, networking devices, accessories, mobile devices, IoT devices, retail devices, healthcare devices, etc.), as described herein. Enforcement points including firewall 206 and switch 210 may be any device (e.g., network device 104, cloud infrastructure, etc.) that is operable to allow traffic to pass, drop packets, restrict traffic, etc. Network monitor entity 280 may be any of a variety of network devices or entities, e.g., router, firewall, an access point, network access control (NAC) device, intrusion prevention system (IPS), intrusion detection system (IDS), deception device, cloud-based entity or device, virtual machine based system, etc. Network monitor entity 280 may be substantially similar to network monitor entity 102. Embodiments support IPv4, IPv6, and other addressing schemes. In some embodiments, network monitor entity 280 may be communicatively coupled with firewall 206 and switch 210 through additional individual connections (e.g., to receive or monitor network traffic through firewall 206 and switch 210).

Switch 210 communicatively couples the various entities of network 200 including firewall 206, network monitor entity 280, and devices 220-222. Firewall 206 may perform network address translation (NAT). Firewall 206 communicatively couples network 200 to Internet 250 and firewall 206 may restrict or allow access to Internet 250 based on particular rules or ACLs configured on firewall 206. Firewall 206 and switch 210 are enforcement points, as described herein.

Network monitor entity 280 can access network traffic from network 200 (e.g., via port mirroring or SPAN ports of firewall 206 and switch 210 or other methods). Network monitor entity 280 can perform passive scanning of network traffic by observing and accessing portions of packets from the network traffic of network 200. Network monitor entity 280 may perform an active scan of an entity of network 200 by sending one or more requests to the entity of network 200. The information from passive and active scans of entities of network 200 can be used to determine one or more features associated with the entities of network 200 (e.g., evidence).

Network monitor entity 280 includes local classification engine 240 and query generator 270. Local classification engine 240 may perform classification of the entities of network 200 including firewall 206, switch 210, and devices 220-222. Local classification engine 240 may designate attributes and classify one or more entities of network 200 based on the information collected about, or otherwise associated with the entities. For example, local classification engine 240 may locally perform a classification of an entity. In some embodiments, local classification engine 240 can also send data (e.g., attribute values) about entities of network 200, as determined by local classification engine 240, to classification system 262 of network 260, described in more detail below. Network 260 may be a cloud-based network (e.g., private or public cloud) of interconnected computing devices for providing computing services. Local classification engine 240 may encode and encrypt the data prior to sending the data to classification system 262. Local classification engine 240 may receive a classification from classification system 262 which network monitor entity 280 can use to perform various security related measures. In some embodiments, classification of an entity may be performed in part by local network monitor entity 280 (e.g., local classification engine 240) and in part by classification system 262 (e.g., cloud classification engine 264).

Classification system 262 may be a cloud classification system operable to perform entity classification, as descried herein. In some embodiments, classification system 262 may be part of a larger system operable to perform a variety of functions, e.g., part of a cloud-based network monitor entity, security device, etc. For example, classification system 262 can collect information associated with entities of network 200 and store the information at cloud entity data store 268 to be used for classifying of the entities of the network 200.

Figure 3A:
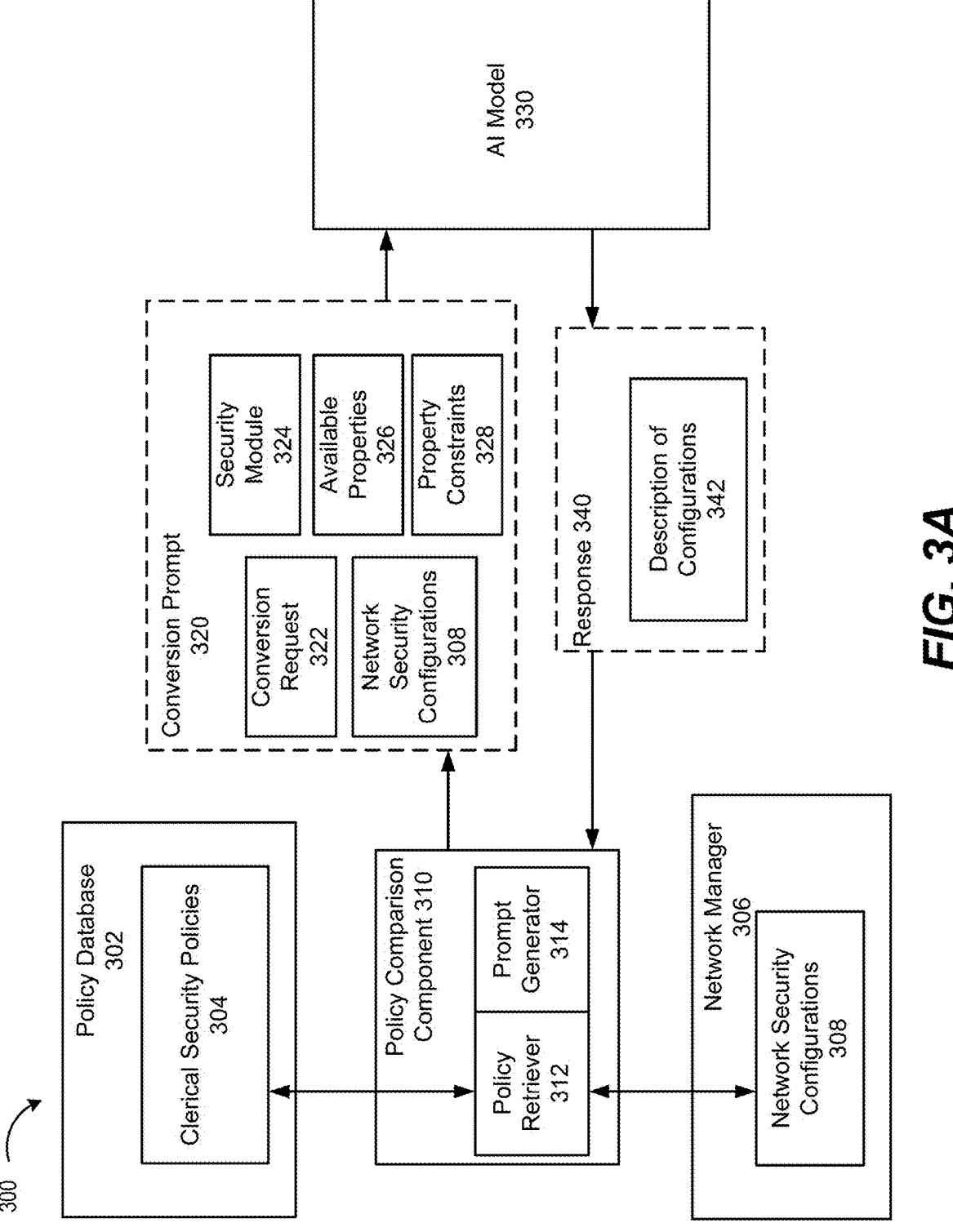
FIG. 3A depicts an example of a system for alignment of clerical and configuration based security policies, according to some embodiments of the present disclosure.

FIG. 3A depicts an example of a system 300 for alignment of clerical and configuration based security policies during a configuration conversion stage, according to some embodiments of the present disclosure. As depicted, system 300 includes a policy comparison component 310 (e.g., implemented by policy alignment system 282 or 272). Policy comparison component 310 may include a policy retriever 312 to retrieve network security configurations 308 from a network manager 306. For example, network manager 306 may be a network monitor entity, an administrative network security management system or other entity or device for managing application of network security policies (e.g., access control lists, firewalls, etc.) The policy comparison component 310 may also include a prompt generator 314 to generate a prompt to an AI model to convert the network security configurations 308 into a plain text description of the operation of the network security configurations. For example, the network security configurations 308 may include structured data (e.g., in XML, JSON, or other structured format) that is applied to devices in a network to enforce a network security policy.

The prompt generator 314 may generate conversion prompt 320 including a conversion request 322, the network security configurations 308, a security module 324 associated with the network security configurations 308, available properties 326 that can be applied to devices or systems according to the security module 324, and property constraints 328 of the available properties 326. The conversion request 322 may include a request to the AI model 330 to translate the network security configurations 308 from the structured format to a description in plain text. In some embodiments, the conversion request 322 may refer to the security module 324, the available properties 326, and the property constraints 328 for translation of the network security configurations (e.g., as a dictionary, context, etc.). The AI model 330 may receive the conversion prompt 320 and generate a response 340 including a description 342 of the network security configurations 308. The description 342 may include a plain text description of the operation of the network security configurations 308 (e.g., how they are applied, the logical steps of application, relationships between property application, or any other aspects of the operation of the configurations).

Figure 3B:
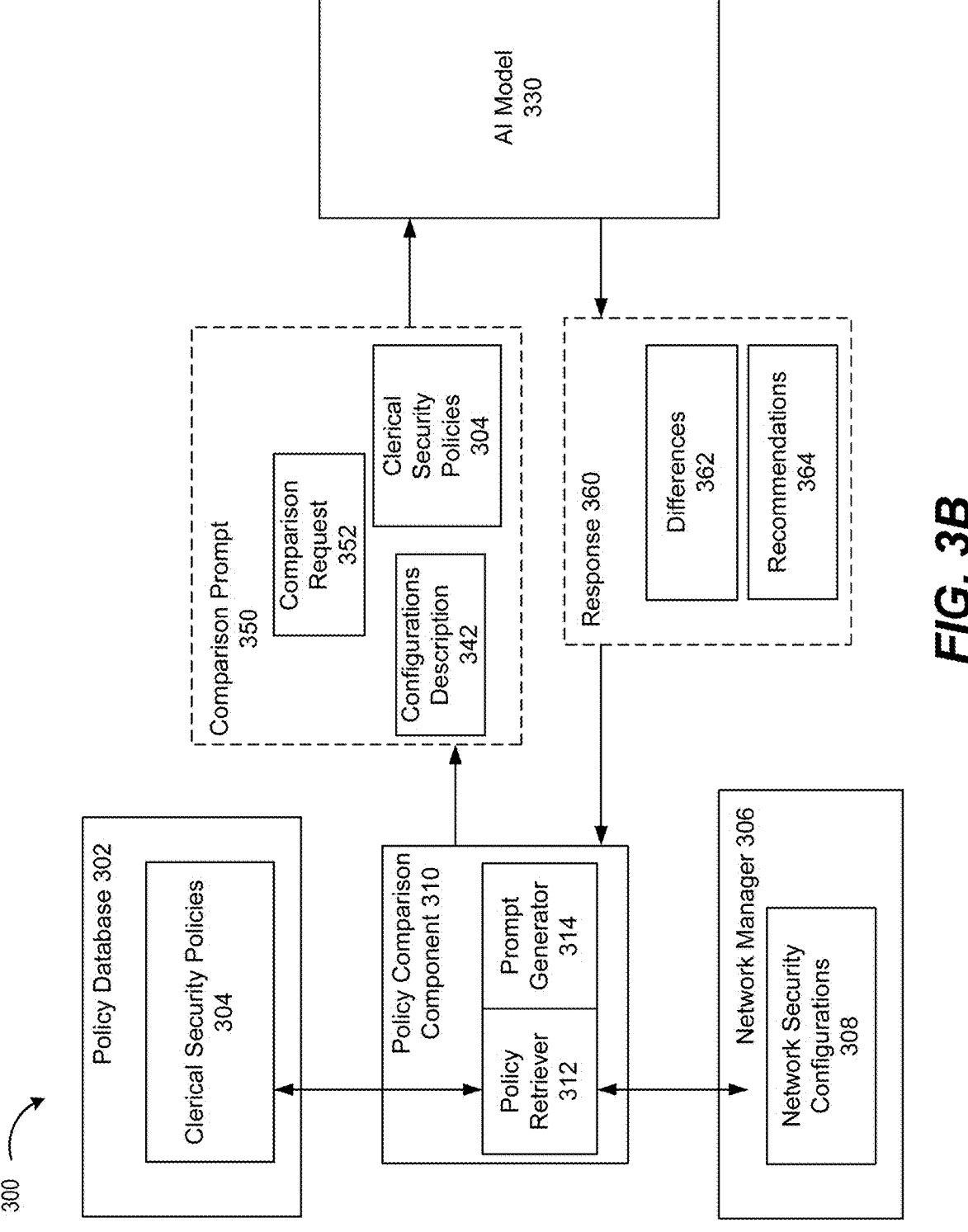
FIG. 3B depicts another example of a system for alignment of clerical and configuration based security policies, according to some embodiments of the present disclosure.

FIG. 3B also depicts the system 300 for alignment of clerical and configuration based security policies during a policy comparison stage, according to some embodiments of the present disclosure. In response to receiving the description 342 in response 340 from the AI model 330, the policy comparison component 310 may retrieve clerical security policies 304 corresponding to the network security configurations 308. The prompt generator 314 of the policy comparison component 310 may then generate a second prompt (e.g., comparison prompt 350) to the AI model 330 to compare the clerical security policies 304 with the description 342 of the network security configurations 308. For example, the comparison prompt 350 may include a comparison request 352 to compare configurations description 342 and the clerical security policies 304 and to identify differences between them. The comparison request 352 may request that operational differences be identified and recommendations for remediation of the differences recommended (e.g., steps to align the policies). Accordingly, the AI model 330 may generate response 360 in response to the comparison prompt 350. The response 360 may include the identified differences 362 and one or more recommendations 364 for remediating those identified differences 362.

FIG. 4 depicts a flow diagram of aspects of process 400 of comparing clerical and configuration based security policies, in accordance with one implementation of the present disclosure. Various portions of process 400 may be performed by different components of an entity or device.

Process 400 begins at block 410, where processing logic retrieves a clerical-based security policy and a configuration-based policy associated with a network. In some embodiments, the clerical-based security policy comprises physical security and management of human behavior associated with a network. In some embodiments, the configuration-based security policy is associated with configuration of one or more entities coupled to the network.

At block 420, processing logic generates a prompt to a generative machine learning model, the prompt including a request to compare the clerical-based security policy and the configurations-based security policy. In some embodiments, the comparison prompt further includes a request to provide recommendations to remediate the indicated discrepancies between the clerical-based security policy and the configuration-based security policy. In some embodiments, processing logic first generates a conversion prompt to the generative AI model including a request to convert the configuration-based security policy from a structured format to a plain text description of operation of the configuration-based security policy and provides the conversion prompt to the AI model. Processing logic may further receive a plain text description of operation of the configuration-based security policy from the AI model, wherein the comparison prompt is then generated to compare the plain text description of operation of the configuration-based security policy and the clerical-based security policy. In some embodiments, the conversion prompt includes module specific rules associated with the configuration-based security policy.

At block 430, processing logic provides the prompt to the generative machine learning model. At block 440, processing logic receives a response from the generative machine learning model including indications of discrepancies between the clerical-based security policy and the configuration-based security policy. In some embodiments, processing logic additionally receives recommendations to remediate the indicated discrepancies and performs a remediation action based on the indicated discrepancies.

FIG. 5 depicts a flow diagram of aspects of another example process 500 for comparing and aligning clerical and configuration based security policies, in accordance with one implementation of the present disclosure. Various portions of process 500 may be performed by different components of an entity or device.

Process 500 begins at block 502, where processing logic receives a request to verify a configuration-based security policy in view of a clerical-based security policy for a portion of a network. For example, an administrator or other user of a network security system may provide a request to the processing logic (e.g., policy comparison component 310) to compare the configurations of the network with the clerical-based security policies written for the network.

At block 504, processing logic identifies a set of rules for security policy implementation associated with the portion of the network. For example, the portion of the network may include a module associated with network security, such as an antivirus module, access control list module, etc. Each module of network security may include a set of properties that can be applied to the network or devices of the network to enforce a particular policy implementation. Each set of properties may also be limited to a set of values that can be assigned for the property. Accordingly, the module, the properties associated with the module, and the values or constraints for each property may be used as reference to determine how a particular policy for the module operates.

At block 506, processing logic generates a first prompt to a generative machine learning model to translate the configuration-based security policy from a structured format into a plain language text. In some embodiments, the first prompt may include the security module associated with the policy along with the available properties and property constraints of the security module. Accordingly, the first prompt may include a request to use the information of the security module, the properties, and property constraints of the security module as a reference to translate the configuration-based security policy into a plain text description.

At block 508, processing logic provides the prompt to the generative machine learning model. At block 510, processing logic receives, from the generative machine learning model, a first response including a plain language text description of the configuration-based security policy. The plain language text description may describe the operation of the configuration-based security policy under varying circumstances and scenarios. For example, the description may include what occurs if a violation of the configuration is identified, how communications are handled under various circumstances, what actions are taken to remediate violations, etc.

At block 512, processing logic generates a second prompt to the generative machine learning model to identify discrepancies between the clerical-based security policy and the configuration-based security policy based on the plain language text description of the configuration-based policy. For example, the second prompt may include the clerical-based security policy and the plain language text description of the configuration-based security policy and a request to identify differences in the operation of the two policies (e.g., discrepancies). In some embodiments, the second prompt may also include a request to indicate steps to remediate the discrepancies and to align the clerical-based and configuration-based policies.

At block 514, processing logic receives, from the generative machine learning model, a second response including an indication of discrepancies between clerical-based security policy and the configuration-based security policy. In some embodiments, the response may further include recommended steps to align the configuration-based policy with the clerical-based policy.

At block 516, processing logic provides an indication of the discrepancies via a user interface. At block 518, processing logic, optionally, performs one or more remediation actions to align the configuration-based security policy with the clerical-based security policy.

Figure 6:
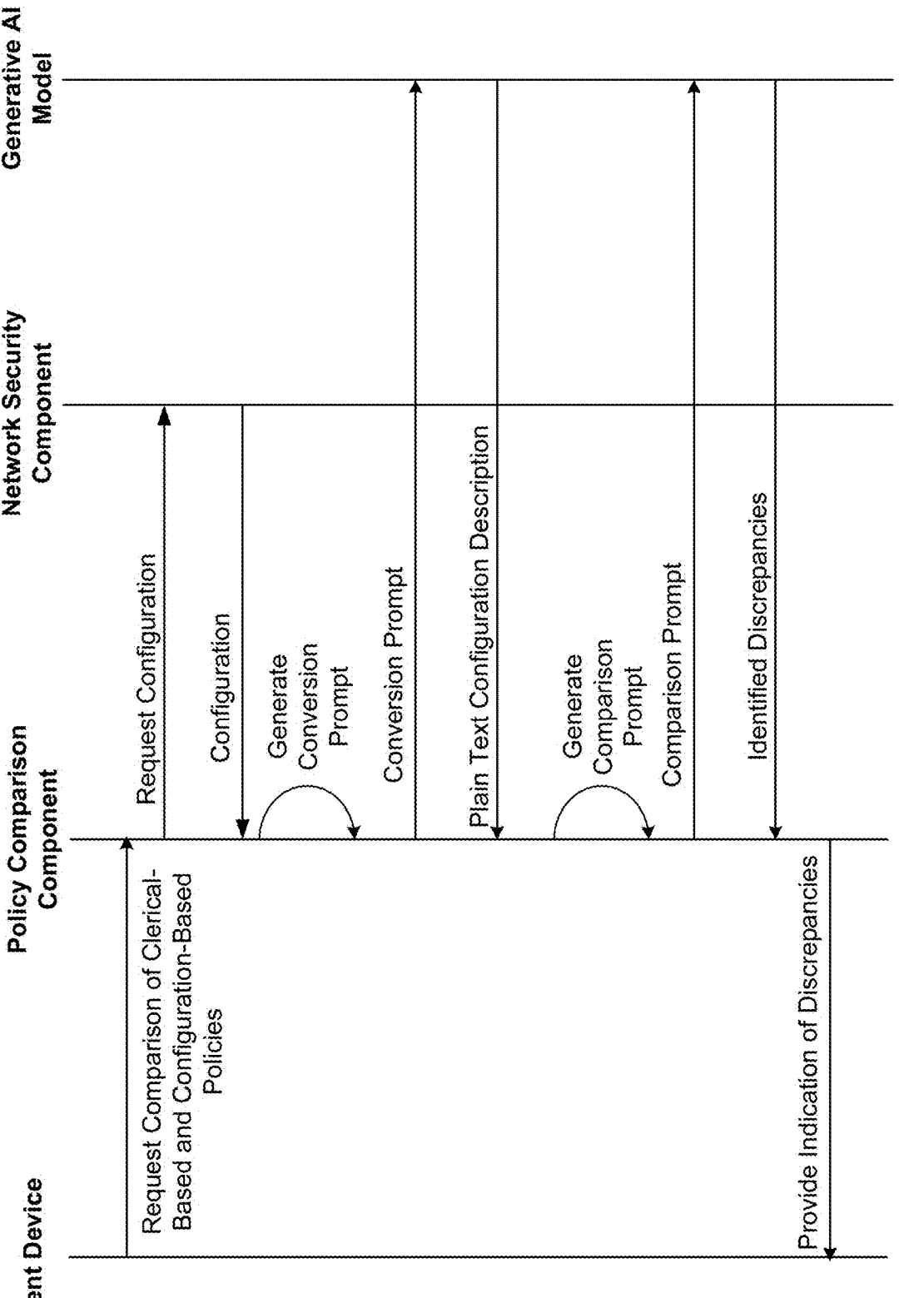
FIG. 6 depicts an example workflow for comparing and aligning clerical and configuration based security policies, according to some embodiments of the present disclosure.

FIG. 6 depicts example workflow 600 for comparing and aligning clerical and configuration based security policies, according to some embodiments of the present disclosure. As depicted, a client device may send a request to a policy comparison component of a policy comparison system to compare clerical-based and configuration-based security policies. The policy comparison component may retrieve the configurations from a network security component such as a network security administration system, a network monitoring system, or any other network security system used to apply configurations to network devices. In some embodiments, the policy comparison component may also request a clerical-based policy from the network security component or from another device or system, such as a policy database, administration account, or the like. In other embodiments, the request from the client device may include the clerical-based policy for comparison with configurations. Upon receiving the configurations from the network security component, the policy comparison component may generate a conversion prompt to a generative AI model. The conversion prompt may include the configuration-based security policy in a structured format (e.g., as applied to the devices in the network) and a request to translate the configuration-based security policy from the structured format into description of operation of the policy in plain text. The policy comparison component may provide the conversion prompt to the generative AI model and receive a plain text configuration description in response. The policy comparison component may then generate a comparison prompt to the generative AI model. The comparison prompt may include the clerical-based policy, the plain text description of the configuration-based policy, and a request to identify discrepancies between the different policies. The policy comparison component may receive a response from the generative AI model including identified discrepancies between the policies and provide those identified discrepancies to the client device for display (e.g., via a graphical user interface).

Figure 7:
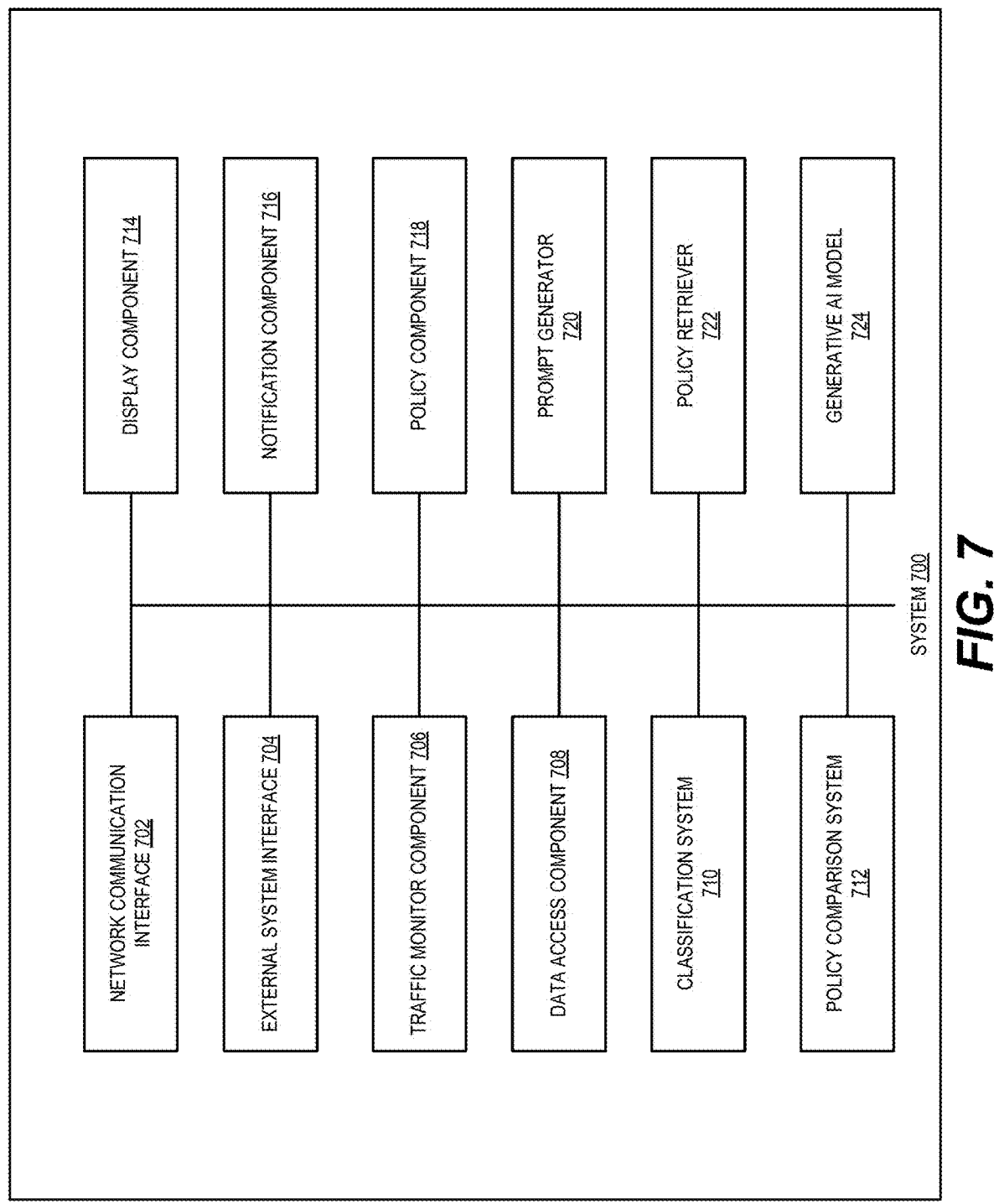
FIG. 7 depicts a component diagram for comparing and aligning clerical and configuration based security policies, according to embodiments of the present disclosure.

FIG. 7 depicts illustrative components of a system for comparing and aligning clerical and configuration based security policies, in accordance with one implementation of the present disclosure. Example system 700 includes a network communication interface 702, an external system interface 704, a traffic monitor component 706, a data access component 708, a classification system 710, a taxonomy framework management system, a display component 714, a notification component 716, a policy component 718, policy comparison system 712, a prompt generator 720, a policy retriever 722, and a generative AI model. The components of system 700 may be part of a computing system or other electronic device (e.g., network monitor entity 102) or a virtual machine or device and be operable to monitor one or more entities communicatively coupled to a network, monitor network traffic, compare and align clerical and configuration based security policies via a generative AI model, or perform one or more actions (e.g., security action, remediation action, etc.), as described herein. For example, the system 700 may further include a memory and a processing device, operatively coupled to the memory, which may perform the operations of or execute the components of system 700. The components of system 700 may access various data and characteristics or features associated with an entity (e.g., network communication information) and data associated with one or more entities. It is appreciated that the modular nature of system 700 may allow the components to be independent and allow flexibility to enable or disable individual components or to extend, upgrade, or combination thereof components without affecting other components thereby providing scalability and extensibility. System 700 may perform one or more blocks of flow diagrams 400-600. In some embodiments, the components of system 700 may be part of network monitor device (e.g., network monitor entity 102), in the cloud, or the various components may be distributed between local and cloud resources.

Communication interface 702 is operable to communicate with one or more entities (e.g., network device 104) coupled to a network that are coupled to system 700 and receive or access information about entities (e.g., device information, device communications, device characteristics, features, etc.), access information as part of a passive scan, send one or more requests as part of an active scan, receive active scan results or responses (e.g., responses to requests), as described herein. The communication interface 702 may be operable to work with one or more components to initiate access to sources of device characteristics for determination of characteristics of an entity to allow determination of one or more features which may then be used for device compliance, asset management, standards compliance, classification, identification, risk assessment or analysis, vulnerability assessment or analysis, etc., as described herein. Communication interface 702 may be used to receive and transmit requests for policy comparisons, as described herein.

External system interface 704 is operable to communicate with one or more third party, remote, or external systems to access information including characteristics or features of an entity (e.g., to be used to determine a security aspects) or cyber threat intelligence. External system interface 704 may further store the accessed information in a data store. For example, external system interface 704 may access information from a vulnerability assessment (VA) system to enable determination of one or more compliance or risk characteristics associated with an entity. External system interface 704 may be operable to communicate with a vulnerability assessment (VA) system, an advanced threat detection (ATD) system, a mobile device management (MDM) system, a firewall (FW) system, a switch system, an access point (AP) system, etc. External system interface 704 may query a third-party system using an API or CLI. For example, external system interface 704 may query a firewall or a switch for information (e.g., network session information) about an entity or for a list of entities that are communicatively coupled to the firewall or switch and communications associated therewith. In some embodiments, external system interface 704 may query a switch, a firewall, or other system for information of communications associated with an entity.

Traffic monitor component 706 is operable to monitor network traffic associated with entities coupled to a network. Traffic monitor component 706 may have a packet engine operable to access packets of network traffic (e.g., passively) and analyze the network traffic. The traffic monitor component 706 may further be able to access and analyze traffic logs from one or more entities (e.g., network device 104, system 150, or aggregation device 106) or from an entity being monitored. The traffic monitor component 706 may further be able to access traffic analysis data associated with an entity being monitored, e.g., where the traffic analysis is performed by a third-party system.

Data access component 708 may be operable for accessing data including metadata associated with one or more network monitoring entities (e.g., the network monitor entity 102), including features that the network monitoring entity is monitoring or collecting, software versions (e.g., of a profile library of the network monitoring entity), and the internal configuration of the network monitoring entity. The data accessed by data access component 708 may be used by embodiments for taxonomy framework generation using a generative AI model and using the taxonomy framework for entity classification. Data access component 708 may further access vertical or environment data and other user associated data, including vertical, environment, common type of entities for the network or network portions, segments, areas with classification issues, etc., which may be used for classification.

Data access component 708 may access data associated with active or passive traffic analysis or scans or a combination thereof. Information accessed by data access component 708 may be stored, displayed, and used as a basis for entity classification via based on a taxonomy framework generated via iterative prompting of a generative AI model, as described herein.

Classification system 710 may identify, retrieve, receive, or otherwise obtain information associated with a device or entity to be classified (e.g., via data access component 708, traffic monitor component 706, etc.). In some embodiments, classification system 710 may perform a classification of a device or entity based on the information associated with the device or entity to be classified. Classifications may be used to apply segmentation or other security policies for a network. For example, the device or entity classifications may assist with application of configuration-based security policies, as described herein.

Policy comparison system 712 may receive a request to compare and align configuration-based security policies with clerical based security policies and generate one or more prompts to a generative AI model to perform the comparisons. In some embodiments, policy comparison system 712 may instruct policy retriever 722 to retrieve, request, or otherwise obtain both a clerical-based and a configuration-based security policy associated with one or more security modules of a network security system. For example, the policy retriever 722 may retrieve security configurations from one or more devices of the network, from a central security management system, or a combination of such. The policy comparison system 712 may then instruct the prompt generator 720 to generate a conversion or translation prompt to generative AI model 724 including a request to translate the configuration-based security policy from a structured format into a plain text description. The policy comparison system 712 may receive a response including the plain text description and instruct the prompt generator 720 to generate a comparison prompt to compare the clerical-based policy with the text description of the configuration-based policy. The generative AI model 724 may thus return an identification of differences and discrepancies between the operation of the configuration-based policy and the intended clerical-based policy.

Figure 8:
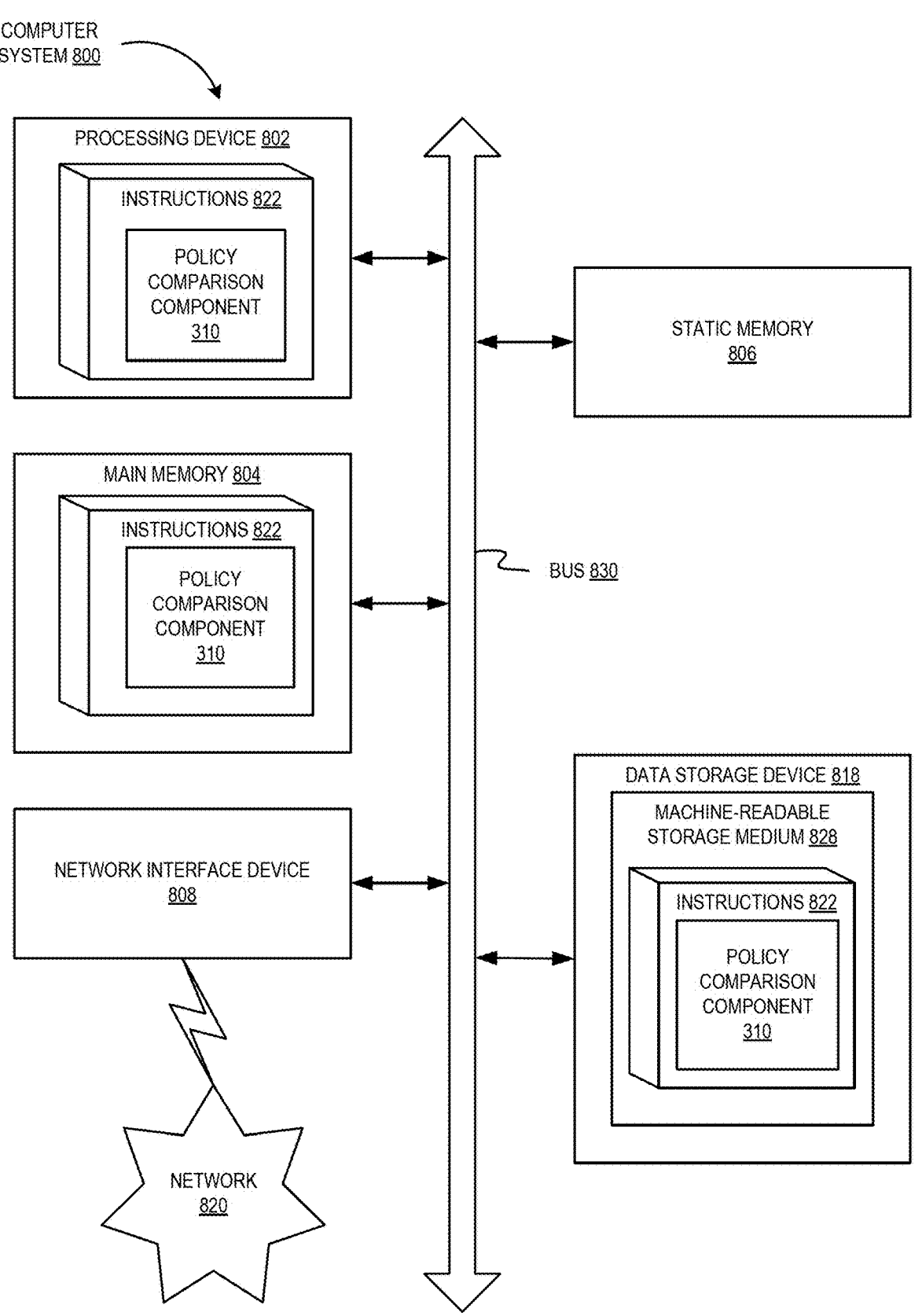
FIG. 8 is a block diagram illustrating an example computer system, in accordance with one implementation of the present disclosure.

FIG. 8 illustrates a diagrammatic representation of a machine in the example form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of a server, such as network monitor entity 102 or policy alignment system 272 running system 700 to compare and align clerical and configuration based security policies.

The exemplary computer system 800 includes a processing device 802, a main memory 804 (e.g., read-only memory (ROM), flash memory, dynamic random access memory (DRAM), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 822, which may be one example of process 400, 500, or 600 of FIGS. 4-6 or systems 300 or 700 shown in FIGS. 3A, 3B, and 7, for performing the operations and steps discussed herein.

The data storage device 818 may include a machine-readable storage medium 828, on which is stored one or more set of instructions 822 (e.g., software) embodying any one or more of the methodologies of operations described herein, including instructions 822 to cause the processing device 802 to compare and align clerical and configuration based security policies using a generative AI model. The instructions 822 may also reside, completely or at least partially, within the main memory 804 or within the processing device 802 during execution thereof by the computer system 800; the main memory 804 and the processing device 802 also constituting machine-readable storage media. The instructions 822 may further be transmitted or received over a network 820 via the network interface device 808.

The machine-readable storage medium 828 may also be used to store instructions to compare and align clerical and configuration based security policies using a generative AI model, as described herein. While the machine-readable storage medium 828 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:

retrieving, by a processing device, a clerical-based security policy and a configuration-based security policy associated with a network, wherein the clerical-based security policy corresponds to the configuration-based security policy;

generating, by the processing device, a conversion prompt comprising an indication of a security component of a plurality of security components, wherein the security component implements specific rules associated with the configuration-based security policy, and wherein each security component of the plurality of security components implements particular rules associated with different configuration-based security policies;

prompting, using the conversion prompt, a generative artificial intelligence (AI) model including a request to translate the configuration-based security policy from a structured data format to a plain text description of the configuration-based security policy, wherein the plain text description describes an application of the configuration-based security policy to a network device;

generating, by the processing device, a comparison prompt to the AI model, the comparison prompt comprising a request to compare the clerical-based security policy and the plain text description of the configuration-based security policy;

providing the comparison prompt to the generative AI model;

receiving a response to the comparison prompt from the generative AI model, the response comprising indications of discrepancies between the clerical-based security policy and the configuration-based security policy, and further comprising operations to align policies;

providing the indications of the discrepancies on a user interface of a client device; and aligning the configuration-based security policy with the clerical-based security policy based on the indications of discrepancies and according to the operations in the response such that the clerical-based security policy matches the configuration-based security policy.

2. The method of claim 1, wherein the comparison prompt further comprises a request to provide recommendations to remediate the indicated discrepancies between the clerical-based security policy and the configuration-based security policy.

3. The method of claim 1, wherein prompting the AI model to translate the configuration-based security policy comprises:

providing a request to the generative AI model to convert the configuration-based security policy from the structured data format to the plain text description of the configuration-based security policy; and receiving the plain text description of the configuration-based security policy, wherein the comparison prompt is generated to compare the plain text description of the configuration-based security policy and the clerical-based security policy.

4. The method of claim 1, wherein the clerical-based security policy comprises physical security and management of human behavior associated with the network.

5. The method of claim 1, wherein the configuration-based security policy is associated with configuration of one or more entities coupled to the network.

6. A system comprising:

a memory; and a processing device, operatively coupled to the memory, to:

retrieve a clerical-based security policy and a configuration-based security policy associated with a network, wherein the clerical-based security policy corresponds to the configuration-based security policy;

generate a conversion prompt comprising an indication of a security component of a plurality of security components, wherein the security component implements specific rules associated with the configuration-based security policy, and wherein each security component of the plurality of security components implements particular rules associated with different configuration-based security policies;

prompt, using the conversion prompt, a generative artificial intelligence (AI) model including a request to translate the configuration-based security policy from a structured data format to a plain text description, wherein the plain text description describes an application of the configuration-based security policy to a network device;

generate a comparison prompt to the AI model, the comparison prompt comprising a request to compare the clerical-based security policy and the plain text description of the configuration-based security policy;

provide the comparison prompt to the generative AI model;

receive a response to the comparison prompt from the generative AI model, the response comprising indications of discrepancies between the clerical-based security policy and the configuration-based security policy, and further comprising operations to align policies;

provide the indications of the discrepancies on a user interface of a client device; and align the configuration-based security policy with the clerical-based security policy based on the indications of discrepancies and according to the operations in the response such that the clerical-based security policy matches the configuration-based security policy.

7. The system of claim 6, wherein the comparison prompt further comprises a request to provide recommendations to remediate the indicated discrepancies between the clerical-based security policy and the configuration-based security policy.

8. The system of claim 6, wherein, to prompt the AI model to translate the configuration-based security policy, the processing device is to:

provide a request to the generative AI model to convert the configuration-based security policy from the structured data format to the plain text description of the configuration-based security policy; and receive the plain text description of the configuration-based security policy, wherein the comparison prompt is generated to compare the plain text description of the configuration-based security policy and the clerical-based security policy.

9. The system of claim 6, wherein the clerical-based security policy comprises physical security and management of human behavior associated with the network.

10. The system of claim 6, wherein the configuration-based security policy is associated with configuration of one or more entities coupled to the network.

11. A non-transitory computer readable storage medium including instructions that, when executed by a processing device, cause the processing device to:

retrieve, by the processing device, a clerical-based security policy and a configuration-based security policy associated with a network, wherein the clerical-based security policy corresponds to the configuration-based security policy;

generate, by the processing device, a conversion prompt comprising an indication of a security component of a plurality of security components, wherein the security component implements specific rules associated with the configuration-based security policy, and wherein each security component of the plurality of security components implements particular rules associated with different configuration-based security policies;

prompt, using the conversion prompt, a generative artificial intelligence (AI) model to translate the configuration-based security policy from a structured data format to a plain text description, wherein the plain text description describes an application of the configuration-based security policy to a network device;

generate, by the processing device, a comparison prompt to the AI model, the comparison prompt comprising a request to compare the clerical-based security policy and the plain text description of the configuration-based security policy;

provide the comparison prompt to the generative AI model;

receive a response to the comparison prompt from the generative AI model, the response comprising indications of discrepancies between the clerical-based security policy and the configuration-based security policy, and further comprising operations to align policies;

provide the indications of the discrepancies on a user interface of a client device; and align the configuration-based security policy with the clerical-based security policy based on the indications of discrepancies and according to the operations in the response such that the clerical-based security policy matches the configuration-based security policy.

12. The non-transitory computer readable storage medium of claim 11, wherein the comparison prompt further comprises a request to provide recommendations to remediate the indicated discrepancies between the clerical-based security policy and the configuration-based security policy.

13. The non-transitory computer readable storage medium of claim 11, wherein, to prompt the AI model to translate the configuration-based security policy, the instructions cause the processing device to:

provide a request to the generative AI model to convert the configuration-based security policy from the structured data format to the plain text description of the configuration-based security policy; and receive the plain text description of the configuration-based security policy, wherein the comparison prompt is generated to compare the plain text description of the configuration-based security policy and the clerical-based security policy.

14. The non-transitory computer readable storage medium of claim 11, wherein the clerical-based security policy comprises physical security and management of human behavior associated with the network.

15. The non-transitory computer readable storage medium of claim 11, wherein the configuration-based security policy is associated with configuration of one or more entities coupled to the network.

\* \* \* \* \*